No. 785,659. PATENTED MAR. 21, 1905.
G. BROWN.
COFFEE CARTRIDGE.
APPLICATION FILED JAN. 17, 1902. RENEWED SEPT. 17, 1904.
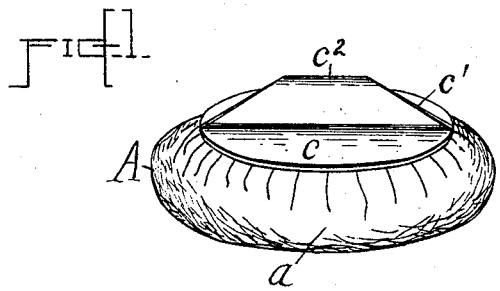
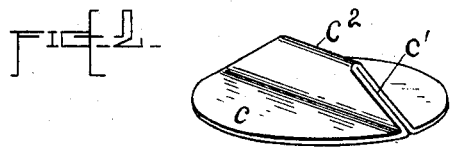
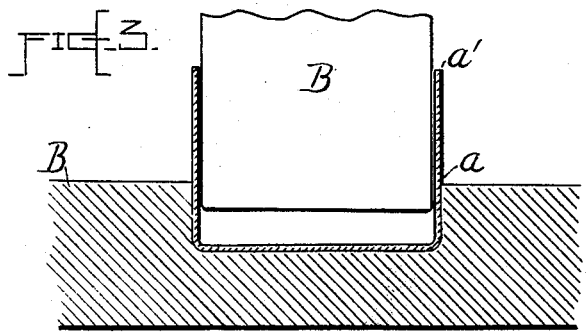
Witnesses:
Otto Greenberg
Geo. L. Wheelock.
Inventor
Goodwin Brown
By Thomas Ewing Jr.,
Attorney No. 785,659. Patented March 21, 1905.

UNITED STATES PATENT OFFICE.

GOODWIN BROWN, OF YONKERS, NEW YORK.

COFFEE-CARTRIDGE.

SPECIFICATION forming part of Letters Patent No. 785,659, dated March 21, 1905.

Application filed January 17, 1902. Renewed September 17, 1904. Serial No. 224,856.

*To all whom it may concern:*

Be it known that I, GOODWIN BROWN, a citizen of the United States of America, and a resident of Yonkers, county of Westchester, and State of New York, have invented certain new and useful Improvements in Coffee-Cartridges, of which the following is a specification.

The object of my invention is to provide a cartridge for percolating pulverized or powdered coffee or substitutes therefor in which the coffee, &c., is incased in a shell formed of pervious material and of a convenient shape to permit its use in connection with a drip-coffee pot, whereby a cartridge containing a definite quantity of the substance can be placed in a dripper and subjected to the action of boiling water passing therethrough, the shell being so constructed as to be damaged or defaced in use and to permit the passage of the water and the soluble constituents of the substance, but serving as a filter to retain the grounds.

A percolator-cartridge made in accordance with this invention forms a convenient package for the transportation and use of the substance contained therein and as such may be an article of merchandise.

With these objects in view my invention consists in the construction, arrangement, and combination of the several parts of which it is composed, as will be hereinafter more fully described and claimed.

Referring to the accompanying drawings, in which corresponding parts are designated by corresponding marks of reference, Figure 1 is a perspective view of a percolating-cartridge constructed in accordance with this invention. Fig. 2 is a view showing the integral cover and handle for the cartridge. Fig. 3 is a view illustrating a convenient way of making the cartridge shown in Fig. 1.

The cartridge A consists of a shell, preferably of paper, containing the "coffee," which term will be hereinafter used to designate a coffee or coffee substitute. The shell itself is formed of a body portion or blank $a$, of paper, preferably in the shape of a disk, having its edges $a'$ bent up and folded down over the coffee.

In Fig. 3 I have shown a convenient way of making such cartridge. In this figure B represents a suitable block having in its upper face a central depression, such as $b$, of a diameter about equal to the desired diameter of the finished cartridge. A plunger B' for the recess is provided, and the blank $a$ of suitable size and characteristics having been laid upon the block centrally over the recess therein the plunger is pushed down, forming the blank into a cup. Into the cup so formed a measured and determined quantity of coffee is poured, and the edges of the body-blank are then folded inwardly and down upon the coffee. A cover $c$, also of paper, is then placed upon the inwardly-turned edges $a'$ of the blank $a$ and secured thereto by means of dextrine or other soluble adhesive material.

The cover $c$ has for convenience in handling the cartridge a handle $c'$ thereon, and by preference I make this handle integral with the cover, as is shown in detail in Fig. 2. In the device there shown the cover consists of an elongated piece having semicircular ends, the middle of the piece being bent into a fold, as at $c^2$, whereby the cover takes the form of a disk with a diametrical ridge, forming the handle $c'$, projecting from the upper face thereof.

With a cartridge constructed as described when subjected to the action of the boiling water the adhesive material securing the cover to the body-blank will be dissolved, permitting the cover-disk to float away, thus exposing the contents of the cartridge to the direct action of the water, which passes therethrough and through that portion of the body-blank $a$ forming the bottom of the cartridge, the latter serving as a filter to retain the exhausted grounds. It will be noted that a cartridge constructed as above described is necessarily destroyed in use, not only by the discoloration and defacement of the pieces of which it is composed, but also by the dismemberment of the shell. This is of importance in that it precludes the refilling of a shell with other and inferior coffee, it being obvious that a package constructed as above may be sold as an article of merchandise containing a definite or measured quantity of coffee ready for use, the shell furnishing a convenient means of transporting its contents. I have, moreover, found that it is desirable to permit the water to have free and direct access to the upper face of the coffee as permitting a more rapid percolation of the water therethrough. This I accomplish by the use of the separate cover secured to the body of the shell by a soluble adhesive, as above described, which also permits the making of the cover of any desired strength (and I preferably make it of stiff hard paper) for preventing injury to the cartridge in handling and to cause it to hold its shape. As such cover is displaced when the cartridge is in use, it is obvious that it need not be pervious.

The material of which the body of the shell is preferably made is crinkled paper, known as "crêpe-paper," as this serves the office of filtration most admirably.

It will thus be seen that by my improved construction I have provided means whereby coffee may be conveniently handled and sold and whereby the consumer is enabled to use the same with economy and cleanliness, as each package contains a definite quantity of coffee through which all the water entering the cup or pot must pass. Thus by my improvement a given quantity of coffee may be caused to yield a large amount of coffee liquor.

By the word "defaced" is of course implied a package the integrity of which is destroyed or which is ruptured or opened out, so that the water may have direct access to its contents.

Having thus described my invention, what I claim, and desire to secure by Letters Patent of the United States, is—

1. The hereinbefore-described coffee-percolating cartridge, having a paper shell with a pervious and filtering bottom, and a strengthening-top, substantially as described.

2. The hereinbefore-described coffee-percolating cartridge, having a shell, the parts of which are united by a soluble adhesive, whereby the cartridge is constructed and adapted to be ruptured under the action of boiling water, substantially as described.

3. The hereinbefore-described coffee-percolating cartridge, having a shell, with a pervious bottom and a top united thereto by a soluble adhesive, substantially as described.

4. The hereinbefore-described coffee-percolating cartridge having a shell consisting of a pervious body portion with its edges bent inwardly, and a strengthening-cover united thereto by a soluble adhesive, substantially as described.

5. The hereinbefore-described coffee-percolating cartridge, having a shell consisting of a pervious-paper body-blank, having its edges bent inwardly, and a strengthening-cover therefor united to the body-blank by a soluble adhesive, substantially as described.

6. The hereinbefore-described coffee-percolating cartridge, having a shell consisting of a pervious-paper disk having its edges bent inwardly, and a cover of paper provided with a handle, united to the inwardly-bent edges of the pervious disk, substantially as described.

7. The hereinbefore-described coffee-percolating cartridge, having a shell composed of a pervious and filtering body portion, and a paper cover therefor having a handle formed integral therewith, the cover being folded to form the handle, substantially as described.

Signed at New York city, borough of Manhattan, this 16th day of January, 1902.

GOODWIN BROWN.

Witnesses:
GEORGE H. GILMAN,
GEO. L. WHEELOCK.